(12) United States Patent
Cerul

(10) Patent No.: US 6,779,232 B2
(45) Date of Patent: Aug. 24, 2004

(54) PROTECTOR SLEEVE FOR WIRES AND PIPES IN WOOD FRAME CONSTRUCTION

(76) Inventor: Alexis Cerul, 551 E. Empire St., San Jose, CA (US) 95112

( * ) Notice: Subject to any disclaimer, the term of this patent is extended or adjusted under 35 U.S.C. 154(b) by 120 days.

(21) Appl. No.: 10/084,210

(22) Filed: Feb. 28, 2002

(65) Prior Publication Data

US 2003/0159242 A1 Aug. 28, 2003

(51) Int. Cl.[7] .............................. F16L 5/00; H02G 3/22
(52) U.S. Cl. ......................... 16/2.1; 16/2.2; 174/152 R; 174/153 G; 174/158 F; 411/113
(58) Field of Search ............................ 16/2.1, 2.2, 2.5; 227/55; 24/713.6; 174/152 R, 153 R, 154, 153 G, 83, 158 R, 158 F, 167, 152 G; 217/98, 106, 113; 411/177, 173–175, 181, 113

(56) References Cited

U.S. PATENT DOCUMENTS

| | | | | |
|---|---|---|---|---|
| 568,687 A | * | 9/1896 | Kempshall | 16/2.1 |
| 1,080,257 A | * | 12/1913 | Bruchsaler | 174/153 G |
| 2,901,800 A | * | 9/1959 | Koehl | 24/713.7 |
| 4,930,733 A | * | 6/1990 | Logsdon | 248/56 |
| 5,118,057 A | * | 6/1992 | Martin et al. | 248/56 |
| 5,238,344 A | * | 8/1993 | Nagayama | 411/183 |
| D375,250 S | * | 11/1996 | Dollins | D8/356 |
| 6,099,527 A | * | 8/2000 | Hochschuler et al. | 606/61 |
| 6,139,237 A | * | 10/2000 | Nagayama | 411/181 |

FOREIGN PATENT DOCUMENTS

JP            53-072194       *    6/1978

* cited by examiner

Primary Examiner—Robert J. Sandy
Assistant Examiner—André L. Jackson (57) ABSTRACT

The "Protector Sleeve For Wires And Pipes In Wood Frame Construction" is a cylindrical grommet/bushing, that looks like a short length of pipe, that fits snugly in any hole drilled through a stud or joist in wood frame construction and which has anchors on both sides to keep it in place. When the "Protector Sleeve" is in place it shields the hole that was drilled and thereby protects the wire or pipe that the hole was drilled for from being punctured by any screw or nail that might be driven through the wall and into the stud. The "Protector Sleeve" also serves to provide a smooth surface for wires to pass through as they are being pulled through several studs at a time towards their end point. The "Protector Sleeve" also reinforces the stud where it was weakened by the hole that was drilled.

9 Claims, 12 Drawing Sheets

PROTECTOR SLEEVE FOR WIRES AND PIPES IN WOOD FRAME CONSTRUCTION

CROSS REFERENCE TO RELATED APPLICATIONS

Not applicable.

STATEMENT REGARDING FEDERALLY SPONSERD RESEARCH OR DEVELOPMENT

Not applicable.

REFERENCE TO SEQUENCE LISTING, A TABLE OR A COMPUTER PROGRAM LISTING COMPACT DISC APPENDIX

Not applicable.

BACKGROUND OF THE INVENTION

The field of invention or the technical field can be broadly described as wood frame construction, or remodeling, of houses or other buildings. When a structure is built with a wood frame the supports are called "studs," they are usually sixteen inches apart and are usually two by fours, three by fours, or two by sixes. Holes are drilled in the studs so that wires and pipes can reach their final destination. For example, an electrical wire starts at the fuse box and in order to get to the light switch in your bedroom it has to pass through some walls and that means that it has to pass through holes drilled in studs. Similarly, water pipes often have to pass through a stud or two to get to their final destination.

As the full title of the invention ("Protector Sleeve For Wires And Pipes In Wood Frame Construction") indicates, the invention protects wires and pipes at the point where they pass through the wood stud. So, not only is the field of invention/technical field wood frame construction, it also crosses over into the filed of wiring (electrical, telecommunications, computer network, cable t.v, etc.) and into the field of plumbing.

A description of the prior, or related, art would be that there is currently only a protector plate. This is a flat steel rectangular plate, one sixteenth of an inch thick, one and a half inches wide, and between two and a half to five and a half inches tall. The protector plate is fastened to the exposed side of the two by four (the one and a half inch thickness of it exactly matches the thickness of the two by four). When the protector plate is in place any nails or screws coming from that direction can not penetrate the steel plate so they do not enter the wood and then reach the hole where the wire or pipe is.

The biggest problem with the prior art is that it does not protect the wire or pipe from nails or screws that can penetrate from the other side. Although a protector plate on each side of the two by four would protect from both sides it is not always possible to do this. Especially during remodeling—when only one side of a wall is open. If only one side of a wall is open only that side gets protected by a protector plate. Similarly, when dealing with exterior walls and the siding is already put in place, only the interior side of the stud gets protected with a protector plate. Since electricians and plumbers usually come onto a job after some walls and usually the siding is already in place it is just not possible to put protector plates on both sides of the wood when a hole is drilled.

Another problem with the prior art is that it does nothing to protect a wire, as it is being pulled through a drilled hole, from snagging on the usually jagged or splintery edges of the hole. A wire snagging on the jagged or splintery edges of a hole results in difficulty pulling the wire through and could cause rips in the plastic sheathing which covers and insulates the wire.

Yet another problem with the prior art is that it does very little to reinforce or strengthen the wood where the hole has been drilled through it.

BRIEF SUMMARY OF THE INVENTION

The "Protector Sleeve" is a cylindrical grommet/bushing, that looks like a short length of pipe, that fits snugly in any hole drilled through a stud in wood frame construction, and which has anchors on both sides to keep it in place. When the "Protector Sleeve" is in place it shields the hole that was drilled and thereby protects the wire or pipe that the hole was drilled for from being punctured by any screw or nail that might be driven through the wall and into the stud. The "Protector Sleeve" also serves to provide a smooth surface for wires to pass through as they are being pulled through several studs at a time towards their end point. The "Protector Sleeve" also reinforces the stud where it was weakened by the hole that was drilled.

BRIEF DESCRIPTION OF THE SEVERAL VIEWS OF THE DRAWING

FIG. 1.

FIG. 2.

FIG. 3.

FIG. 4: FIG. 4 shows a typical version of the "Protector Sleeve" viewed straight on.

FIG. 5.

FIG. 6.

FIG. 7.

FIG. 8.

FIG. 9.

FIG. 10.

FIG. 11.

FIG. 12.

DETAILED DESCRIPTION OF THE INVENTION

Function/Purpose:

As mentioned above, holes are drilled through studs so that wires and pipes can get to their final destination. The protector sleeve is a metal grommet/bushing that should be placed in the drilled hole before the wire or pipe is run through it. A grommet is defined in the dictionary as: an eyelet of firm material to strengthen or protect an opening or to insulate or protect something passed through it. The "Protector Sleeve" does all these things. It protects the wire or pipe once it is installed in the hole drilled in the stud by acting as a permanent shield against screws or nails that are driven into the stud. It insulates the wire or pipe, from the jagged wood, during the installation process thereby preventing snags or rips and by providing a smooth surface facilitates the installation. And it provides support and reinforcement for the wood stud that has been weakened by the hole drilled through it.

The main function of the "Protector Sleeve" is to protect wires and pipes at the point where they pass through the wood stud. When pictures are being hung or shelves, cabinets or other furniture is being attached to a wall, nails or screws are used. When anything is being hung on, or attached to, a wall the installer usually tries to do so where there is a stud. The installer wants to sink the screw or nail into a stud because this gives support and strength whereas a nail or screw that only penetrates the drywall or plaster, and does not sink into anything behind, will not be able to bear much weight. If a nail or screw happens to go through a wall and into a stud at a point where there is a wire or pipe running through the stud it could puncture that wire or pipe if it goes deep enough. If a wire is penetrated there could be a short circuit which could be dangerous and/or could make that wire useless. If a pipe is punctured (plastic or copper pipes are easily punctured by steel nails and screws) then of course its contents will leak inside the wall. The "Protector Sleeve" protects the pipes and wires from being punctured by providing a steel barrier all around the pipe or wire.

Not only does the "Protector Sleeve" protect the wires and pipes once they are in place but it also protects wires as they are being pulled through the studs when they are being installed. When a hole is drilled through wood its edges are rough and there are splinters or burrs that can snag and rip the plastic sheathing which covers and insulates the wires. When the "Protector Sleeve" is in place it provides a smooth surface for the wire to slide against as it is pulled into place. In this regard the "Protector Sleeve" is a bushing. The dictionary defines a bushing as: a removable cylindrical lining for an opening used to resist abrasion and serve as a guide. The "Protector Sleeve" eliminates contact between the wire and the wood and thereby eliminates the abrasion that could otherwise cause damage to the wire. The "Protector Sleeve" should be installed from the direction the wire or pipe is coming and in that way will act somewhat like a funnel and guide the wire over its smooth surface.

Another function performed by the "Protector Sleeve" is that it provides support and reinforcement for the wood stud at that point where it has been weakened by the hole drilled through it. Removing wood from the stud when a hole is drilled weakens it. Putting a metal grommet in that place will give it back some of its strength. It this regard the "Protector Sleeve" helps transfer any load placed on the stud from above, past and around the drilled hole, like the arches of a tunnel drilled through a mountain distribute the load of the weight of the mountain around the opening.

Physical Description:

The body, 2 the operative component of, the "Protector Sleeve" 1 is a length of pipe that fits snugly in the hole 7 drilled in the stud 8 or joist. If, for example, a seven eighths inch drill bit is used to drill a seven eighths inch hole 7 in a stud 8, the body 2 of the appropriate "Protector Sleeve" 1 would have a seven eighths inch outside diameter. If the width of the stud 8 is one and a half inches (this would be the "two" part of a "two by four" because a "two by four" is really only one and a half inches thick) then the "Protector Sleeve" 1 body 2 would be one and a half inches long. There would be anchors 3&5 on both sides of the "Protector Sleeve" 1 body 2 so that it can be secured in place.

The initial anchor 3 is a ring of metal that flares or splays outward at a right angle to the body 2 and thereby prevents the "Protector Sleeve" 1 from going through the hole 7 and falling out the other side. This initial anchor 3 would perform in the same manner as the rim of a shotgun shell prevents the shell from sliding all the way into the shotgun barrel and falling out the muzzle. Once the "Protector Sleeve" 1 is in place with the initial anchor 3 flush up against the stud 8, the final anchor 5 can be bent into place.

The final anchor 5 is a ¼" strip of steel projecting outward, in the same direction as the body 2 of the "Protector Sleeve," 1 on the side opposite the initial anchor 3, that can be bent downwards 90 degrees so that it is flush with the stud 8. When the final anchor 5 is bent into place it prevents the "Protector Sleeve" 1 from going back out in the direction it was installed from. Both anchors 3&5 should have spikes 4&6 in them which will embed the anchors 3&5 into the wood of the stud 8 and thereby hold the "Protector Sleeve" 1 very secure.

Figure 1:
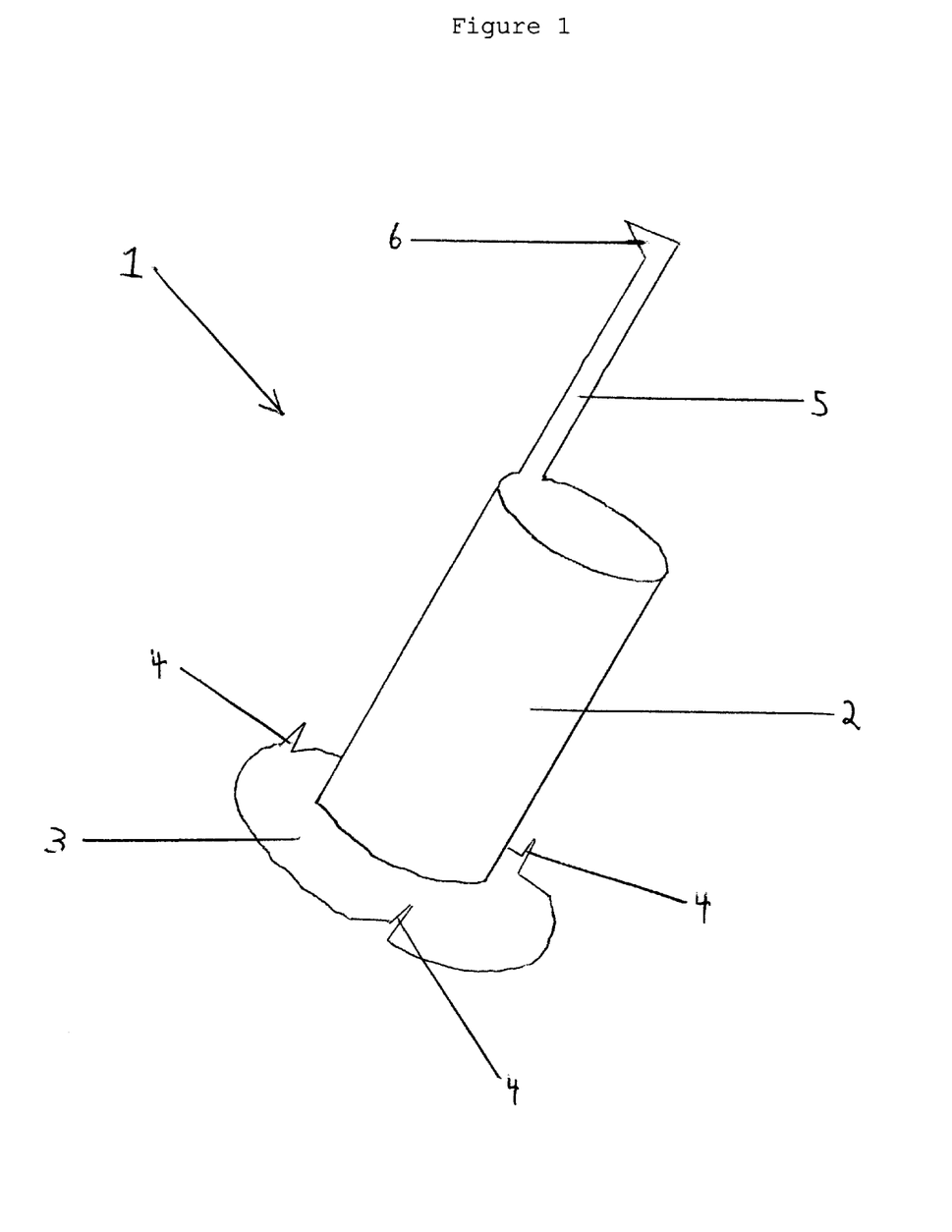
FIG. 1 shows a typical version of the "Protector Sleeve" viewed from an acute angle.
Figure 2:
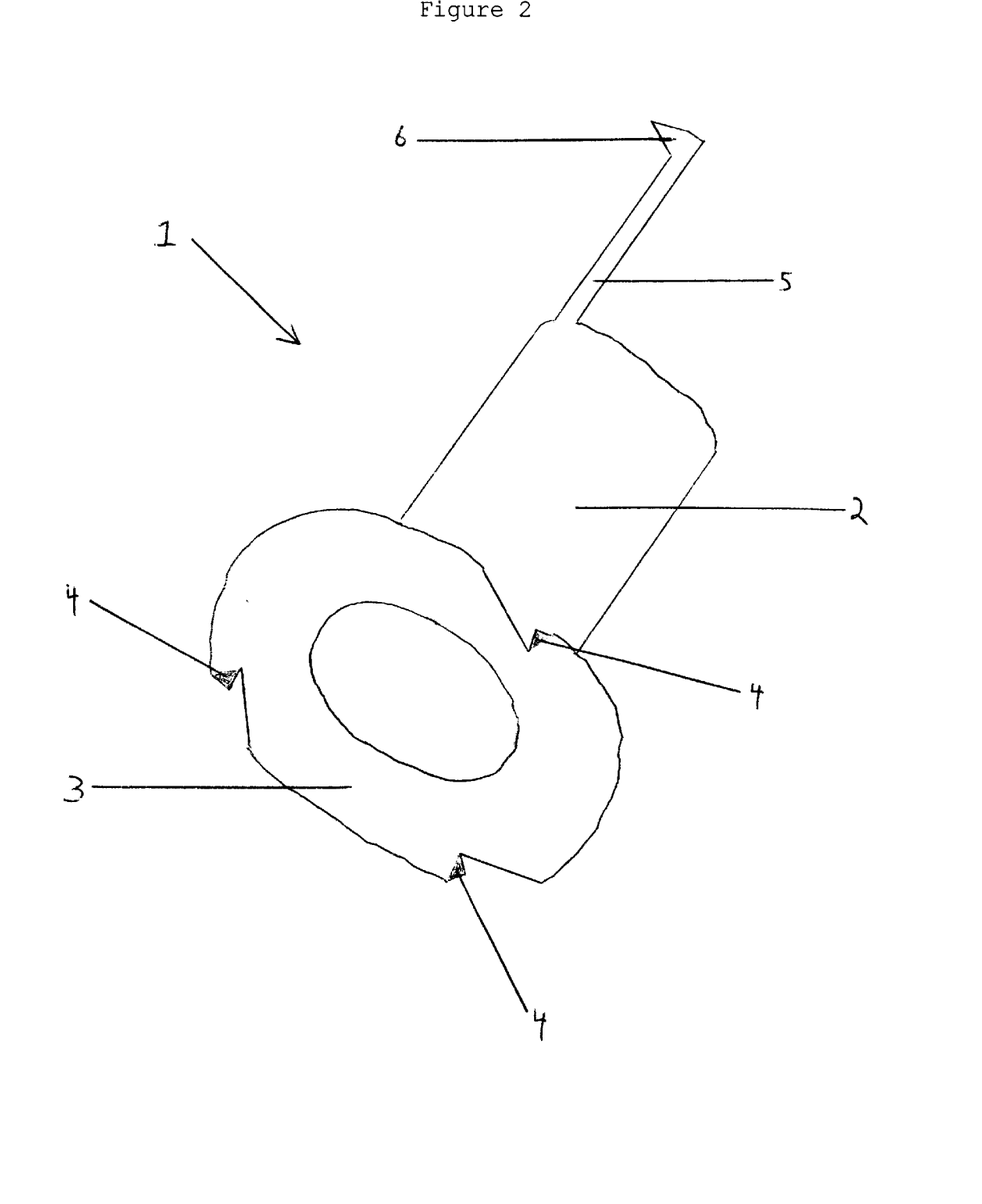
FIG. 2 shows another view of a typical version of the "Protector Sleeve" viewed from another angle.

The best way to visualize what the "Protector Sleeve" 1 looks like is to say that it resembles a miniature top hat with a mailbox flag projecting upward from the side of the hat at its top. (FIGS. 1–2.) The round platform at the top of the top hat would be removed so that something could pass through it. The brim (the word brim is used here to mean the projecting rim) of the top hat would have three diagonal nicks in it which would cause triangular flaps 4 that would be pointed in the same direction as the cylindrical body 2 of the "Protector Sleeve" 1. (The triangular flaps 4 would be pointed in a direction parallel with the cylindrical body 2 and pointing upward if the top hat were being worn.)

Figure 3:
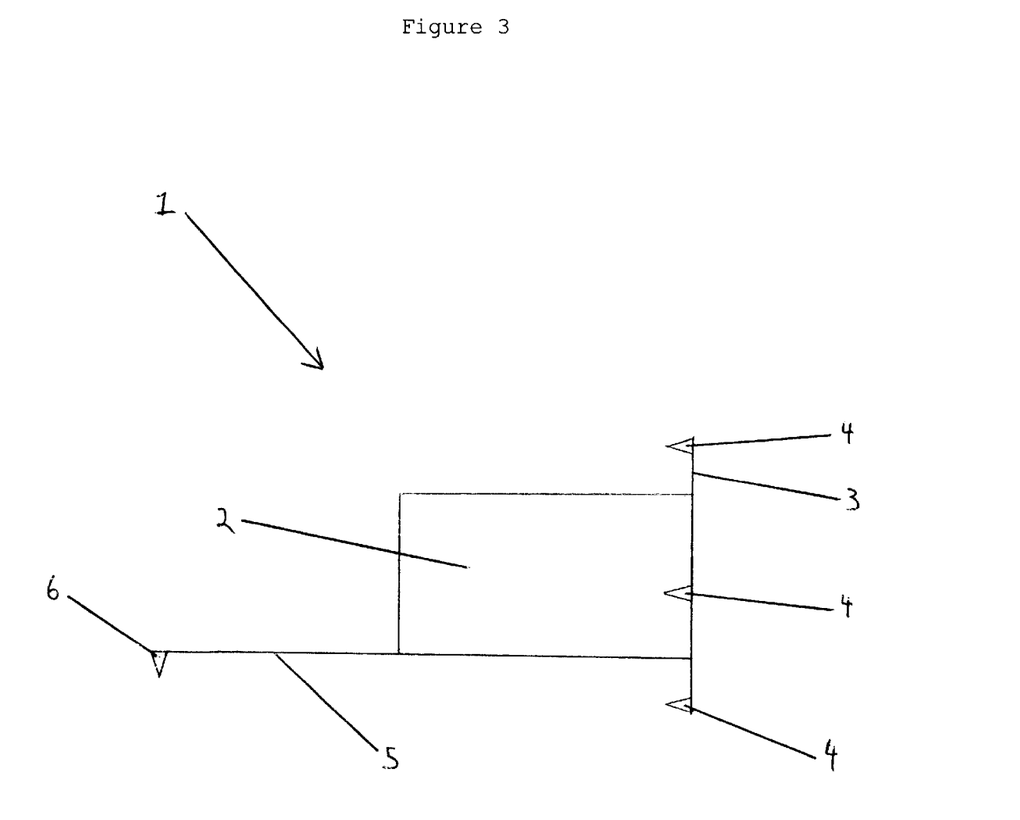
FIG. 3 shows a typical version of the "Protector Sleeve" viewed from the side.
Figure 4:
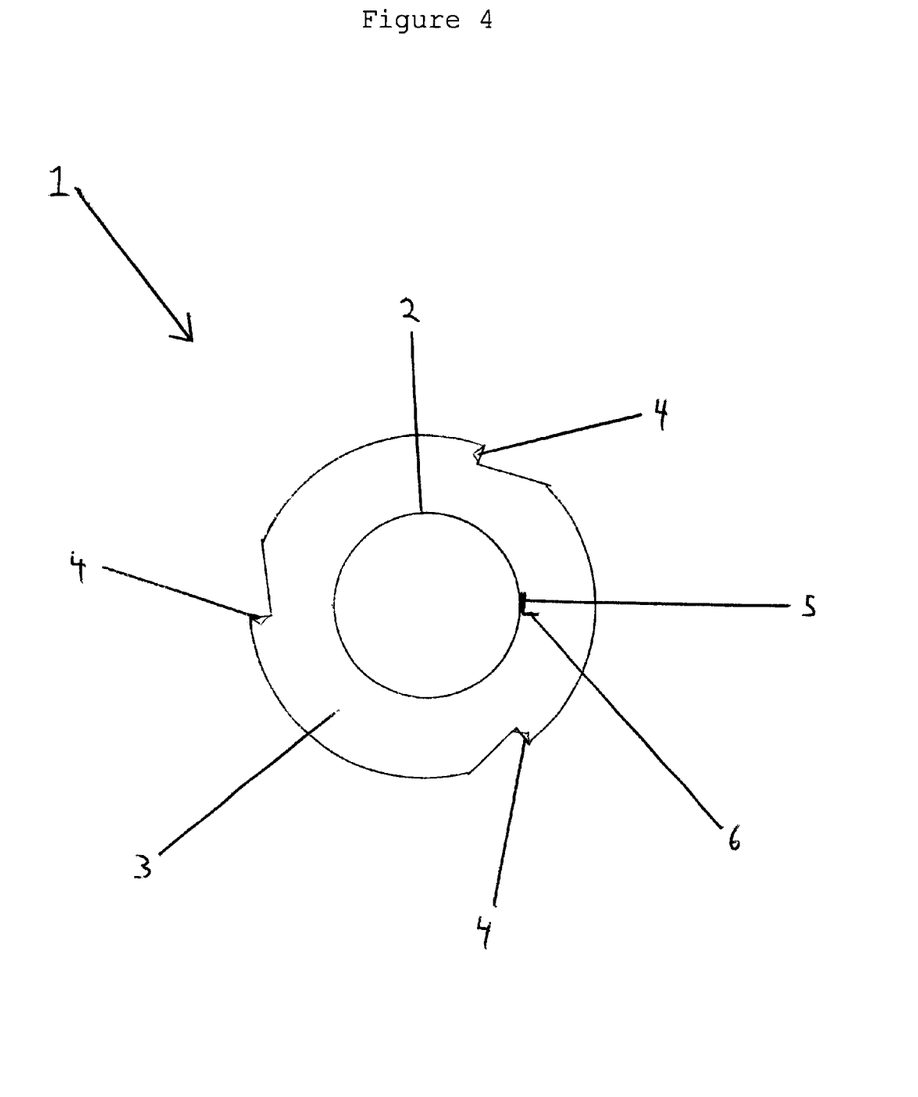

The body 2 of the "Protector Sleeve," 1 the sleeve part of it for which it is titled, is that cylindrical (or tubular) part of the top hat. (FIGS. 3–4.) The body 2 is the operative component of "Protector Sleeve" 1. The body 2 is what serves as a shield for the wire or pipe, provides a smooth surface for wire installation and reinforces the hole 7.

Figure 5:
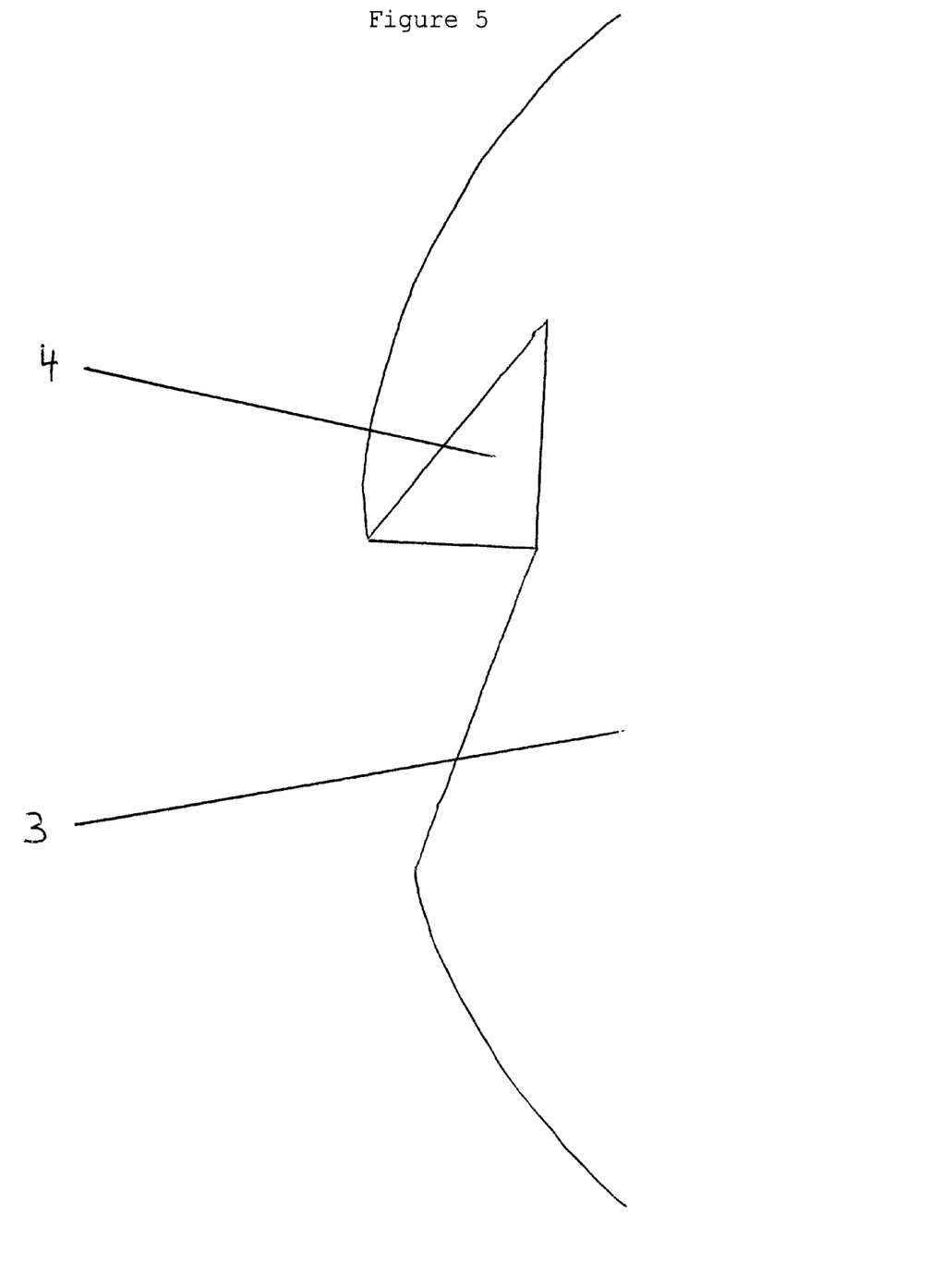
FIG. 5 shows a close up of a section of the initial anchor showing the ninety degree bend of the spike.

The brim of the top hat and the system of three spikes 4 projecting upward from what would be the brim of the top hat will be called the "initial anchor" 3. (FIGS. 3–4.) Since the "Protector Sleeve" 1 is made of steel the triangular flaps 4 would be like spikes/nails that would embed the "Protector Sleeve" 1 into the stud 8. (FIG. 5.) Alternatively, the triangular flaps 4 do not have to be nicks or notches taken out of the brim of the hat and they could simply be sharp little triangles extending outward from the brim and then bend up at a 90 degree angle.

Figure 6:
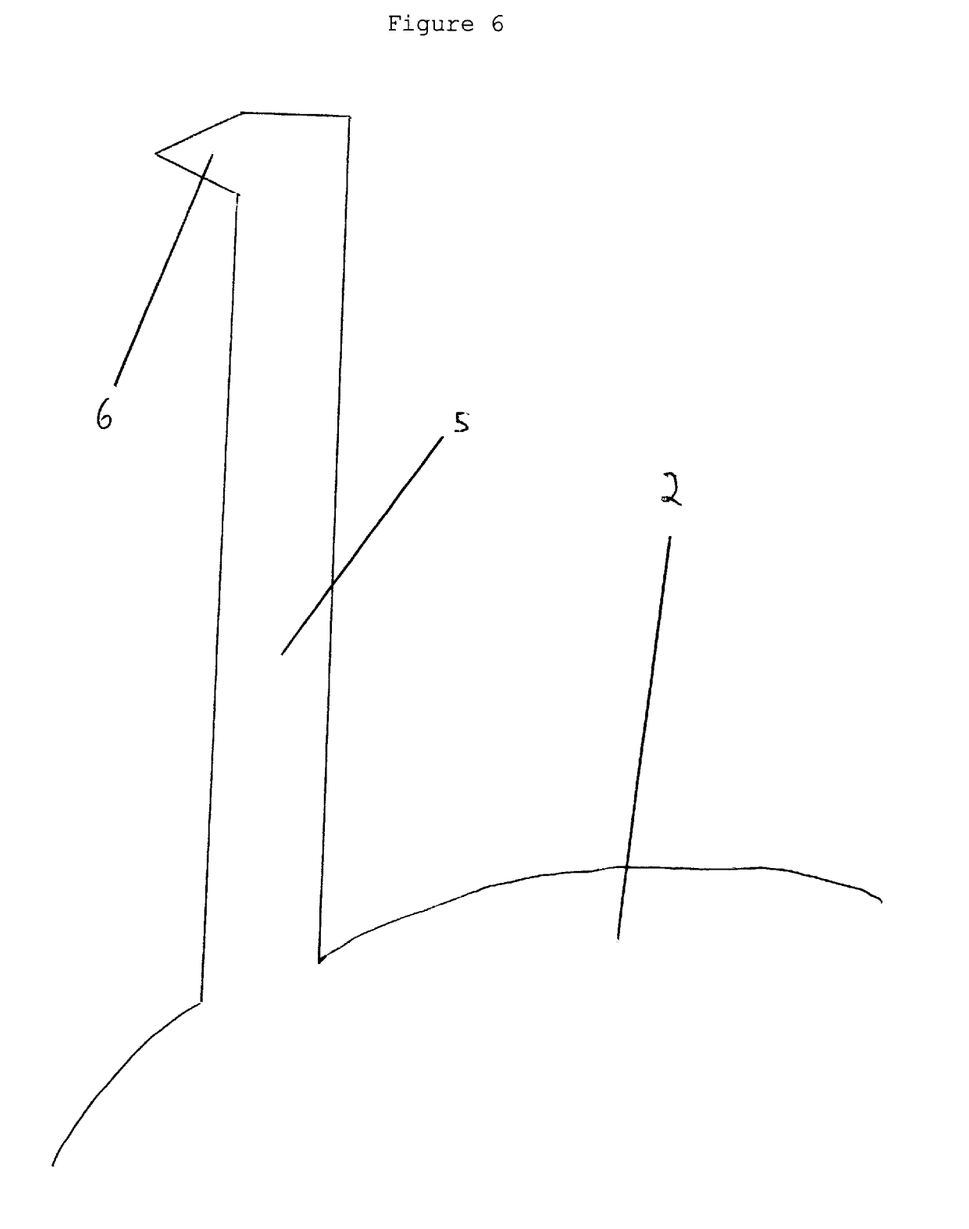
FIG. 6 shows a close up of the final anchor showing the ninety degree bend of its spike.

The part of the "Protector Sleeve" 1 that looks like a mail box flag will be called the final anchor 5. (FIGS. 3–4.) The final anchor 5 consists of a tall thin rectangle with a triangular or pennant type flag 6, (i.e. a flag that tapers to a point like those used for nautical purposes or of the sort that has sports teams names and logos on it), extending from one of its sides at the top. The triangular flag 6 would be bent to a right angle pointing outward from the cylindrical body 2 and in the same direction that the brim projects. (FIG. 6.)

The strip of steel comprising the final anchor 5 should be ¼" longer than the body 2 of the "Protector Sleeve" 1, (the body 2 of "Protector Sleeve" 1 is determined by thickness of material it is going into). The reason the final anchor 5 should be ¼" longer is so that when it is being installed the spike 6 at its tip will clear the hole 7 and the "Protector Sleeve" 1 can be tapped into place easily.

Figure 7:
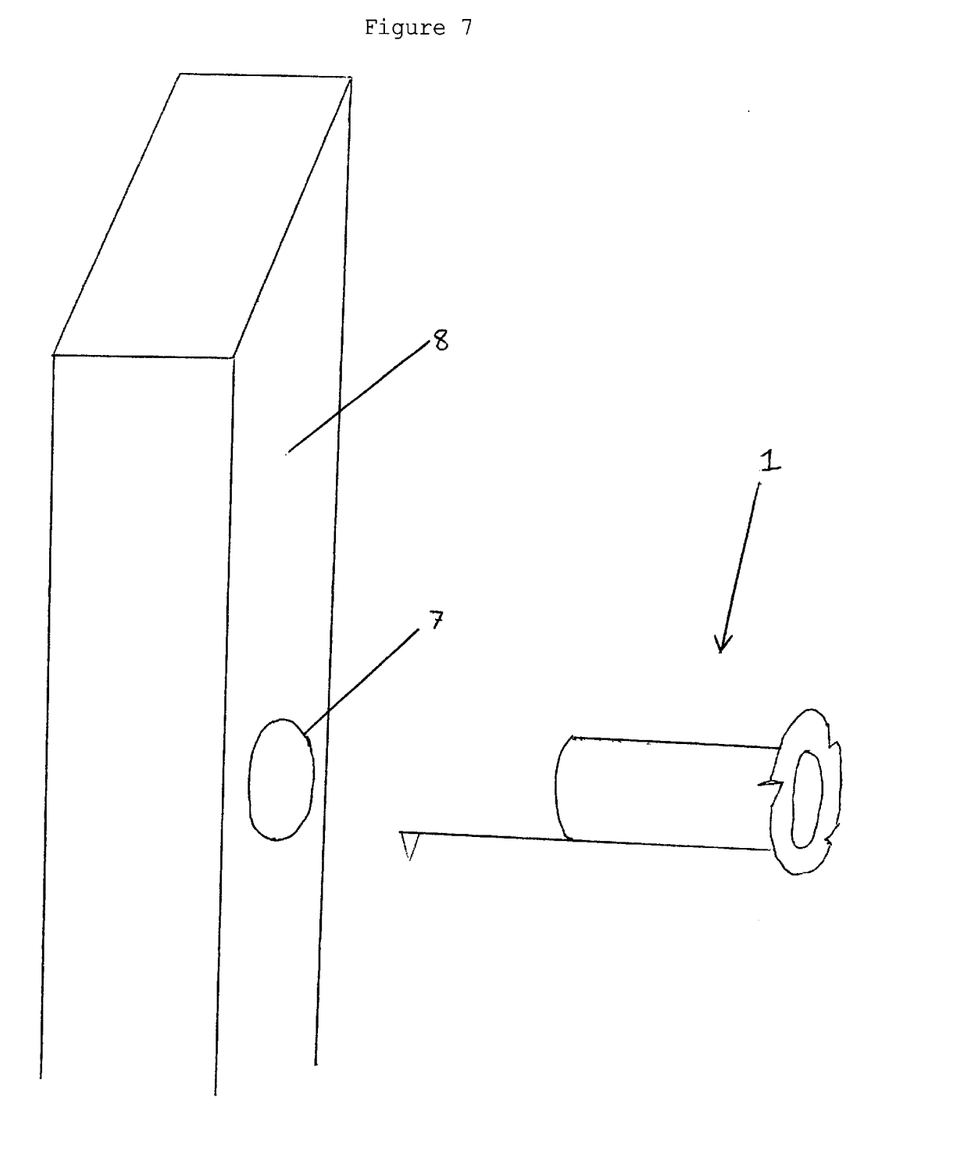
FIG. 7 shows the "Protector Sleeve" next to a two by four with a hole drilled in it prior to installation.
Figure 8:
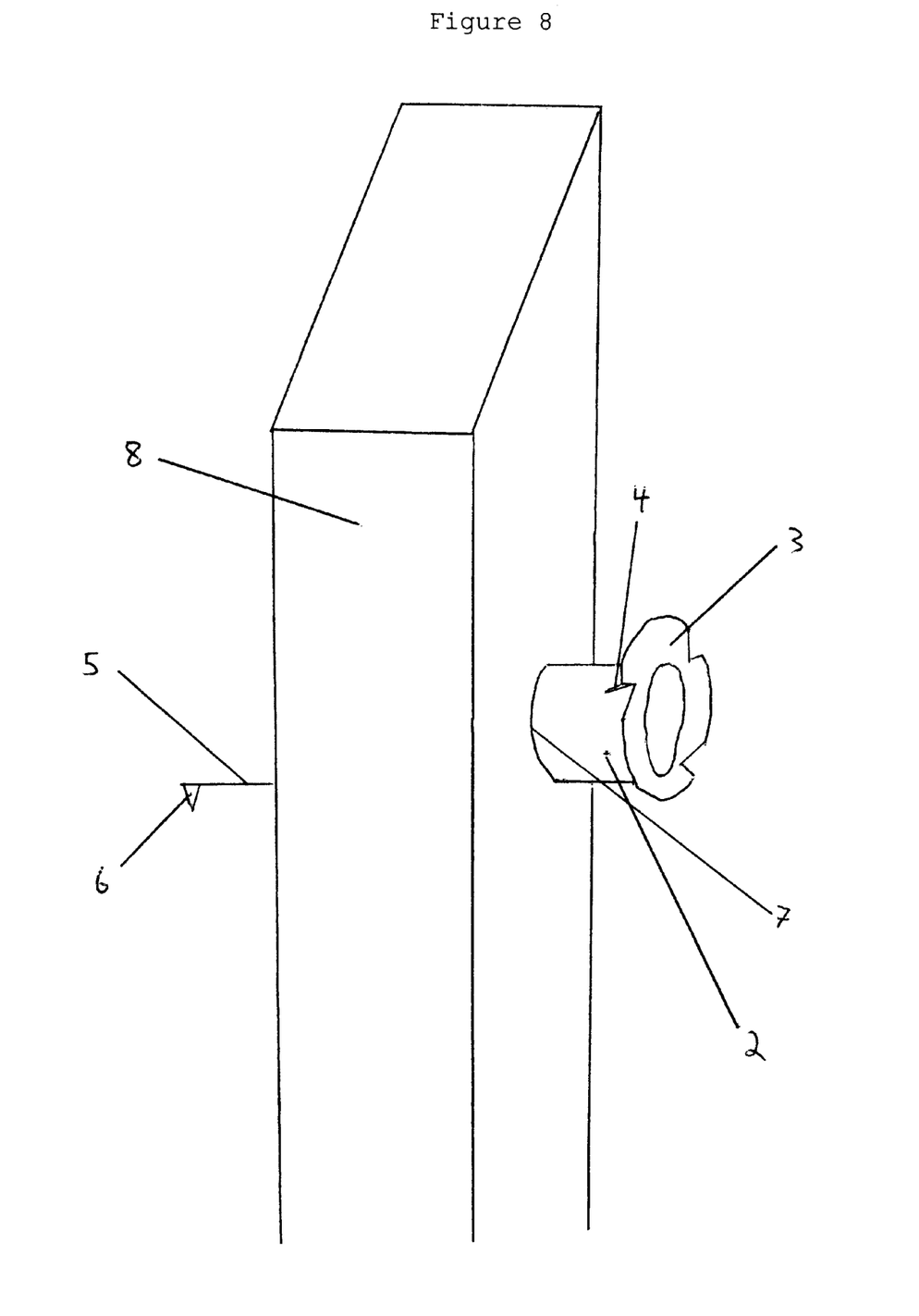
FIG. 8 shows the "Protector Sleeve" put in place by hand into a hole drilled in a two by four.

Installation:

The body 2 of the "Protector Sleeve" 1 slides into the drilled hole 7 in the stud 8. (FIG. 7.) It should be a very tight fit and therefore should require at least some effort to put in place. (FIG. 8.) The initial anchor 3 of the "Protector Sleeve" 1 stops it from going all the way through and falling out the other side. The initial anchor 3 keeps it in place and secures it firmly until the final anchor 5 is tapped into place securing it permanently.

Figure 9:
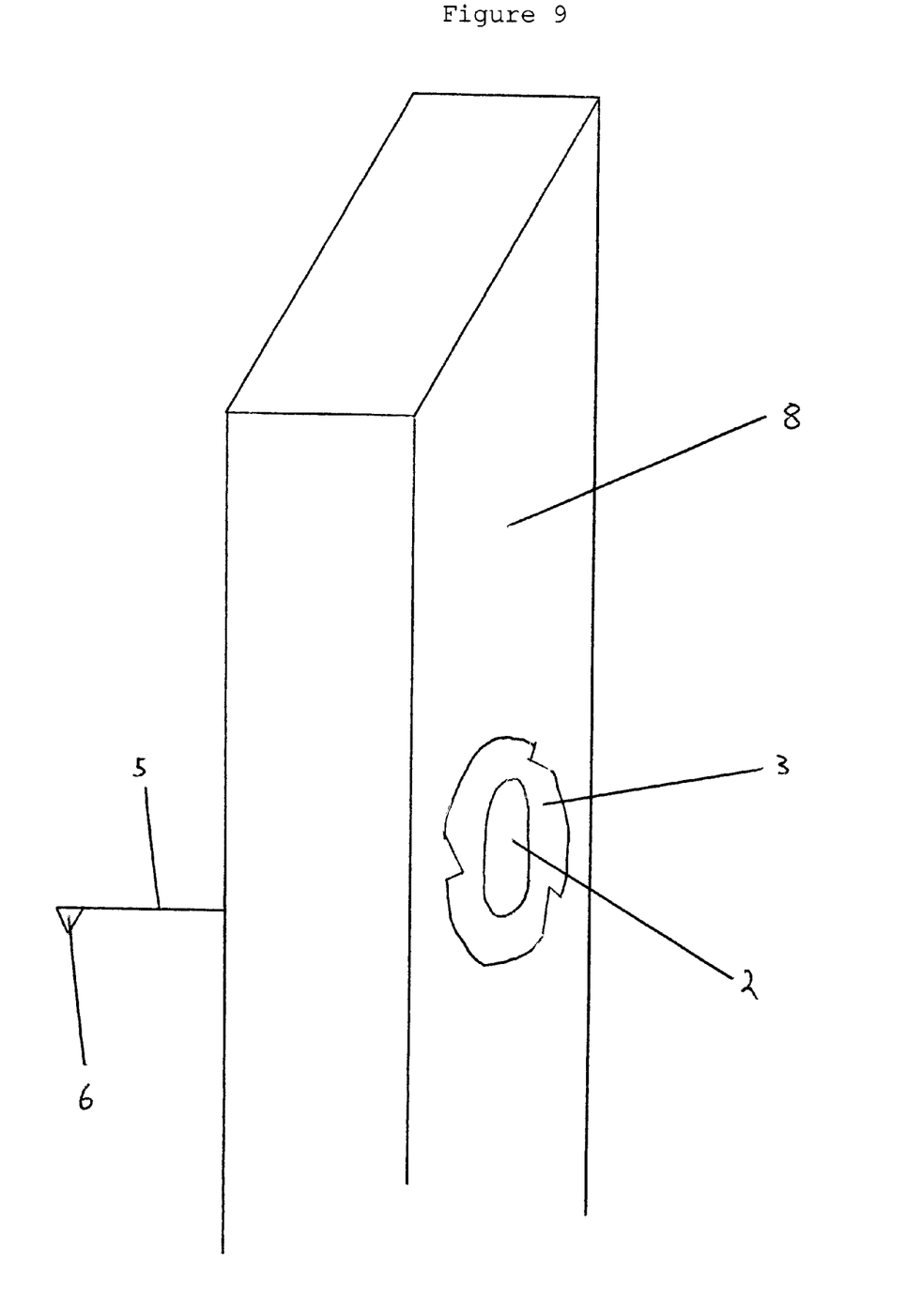
FIG. 9 shows the "Protector Sleeve" slid all the way into the two by four and taped into place so that the initial anchor is flush with the wood and the spikes of the initial anchor are embedded in the wood.

Because the three spikes 4 of the initial anchor 3 project out of the brim and towards the wood, when the tips of the spikes 4 come in contact with the wood it would need a few hammer taps until the entire brim is flush with the wood and the spikes 4 were driven as far into the wood as they could be. (FIG. 9.) Once tapped into place, so that it snugly fits in the hole 7 drilled in the stud 8, the body 2 of the "Protector Sleeve" 1 would be just long enough to reach the other side but not stick out past it. In other words, if the thickness of the stud 8 is one and a half inches then the "Protector Sleeve" 1 body 2 would be one and a half inches so that it completely covers the area of the drilled hole 7 but does not extend beyond it.

Figure 10:
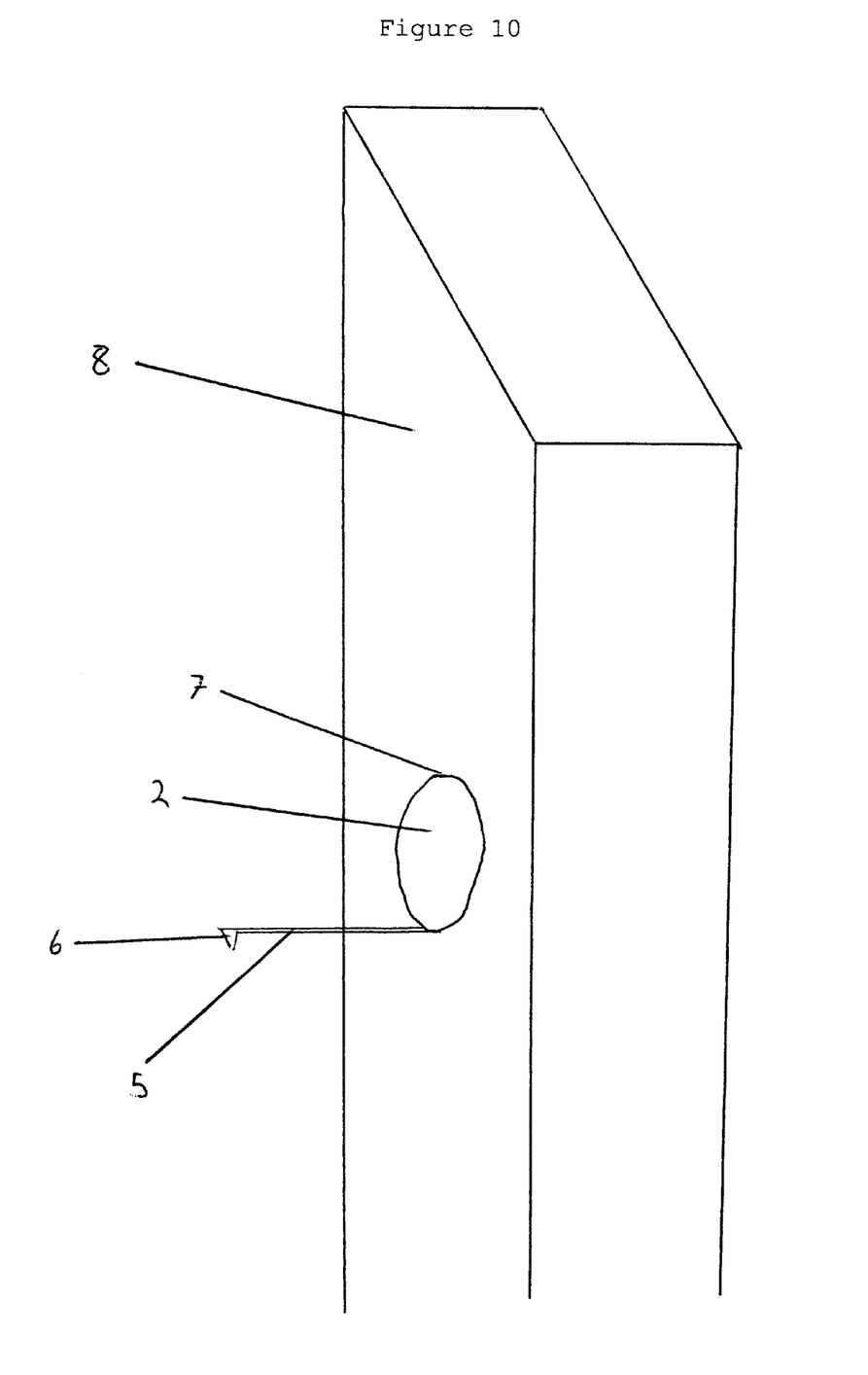
FIG. 10 shows the other side of a two by four with the "Protector Sleeve" fully installed on the initial anchor side and with the final anchor projecting outward.
Figure 11:
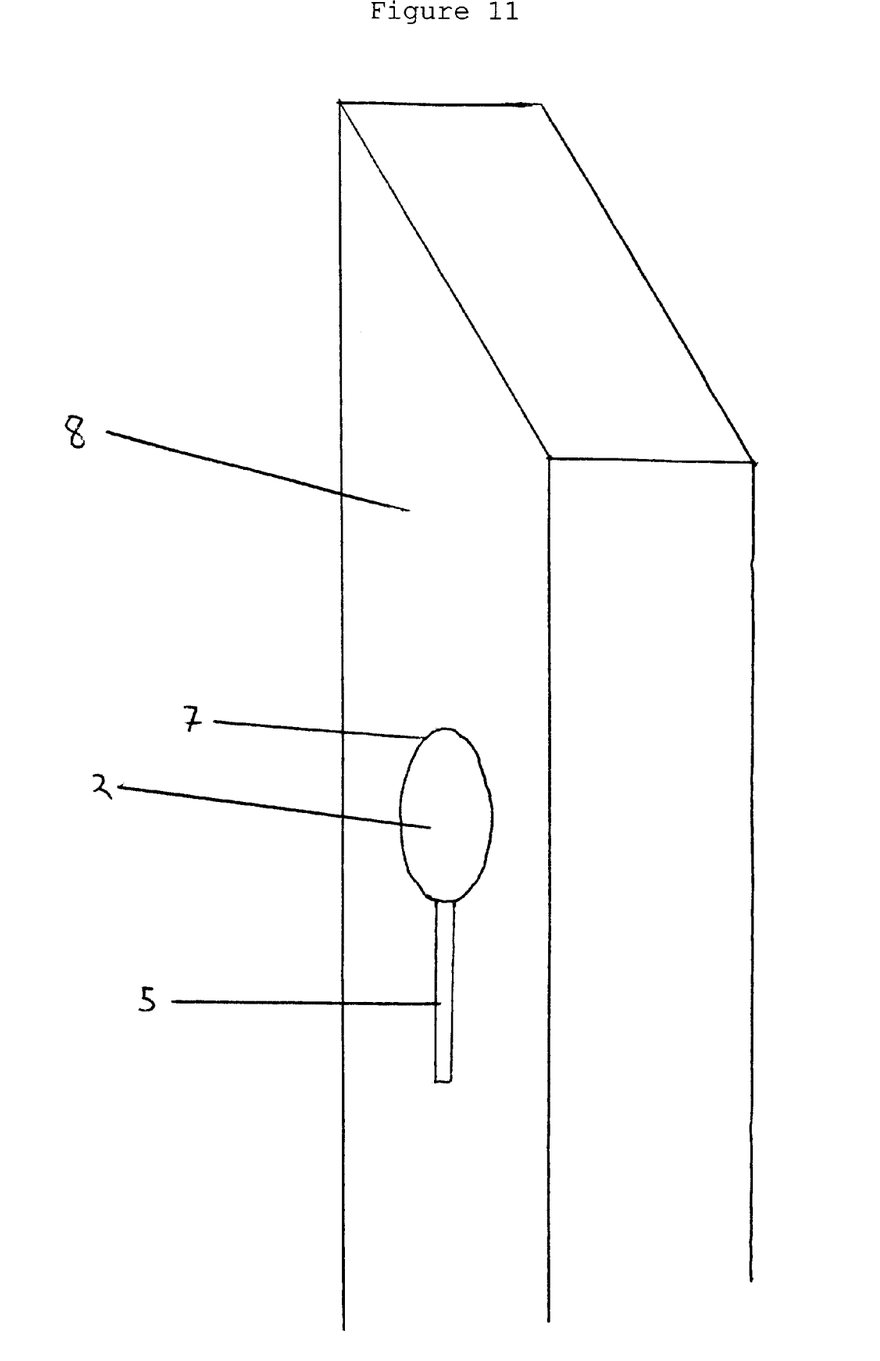
FIG. 11 shows the "Protector Sleeve" viewed from the final anchor side, fully installed, with the final anchor bent down into place and with its spike embedded in the wood.
Figure 12:
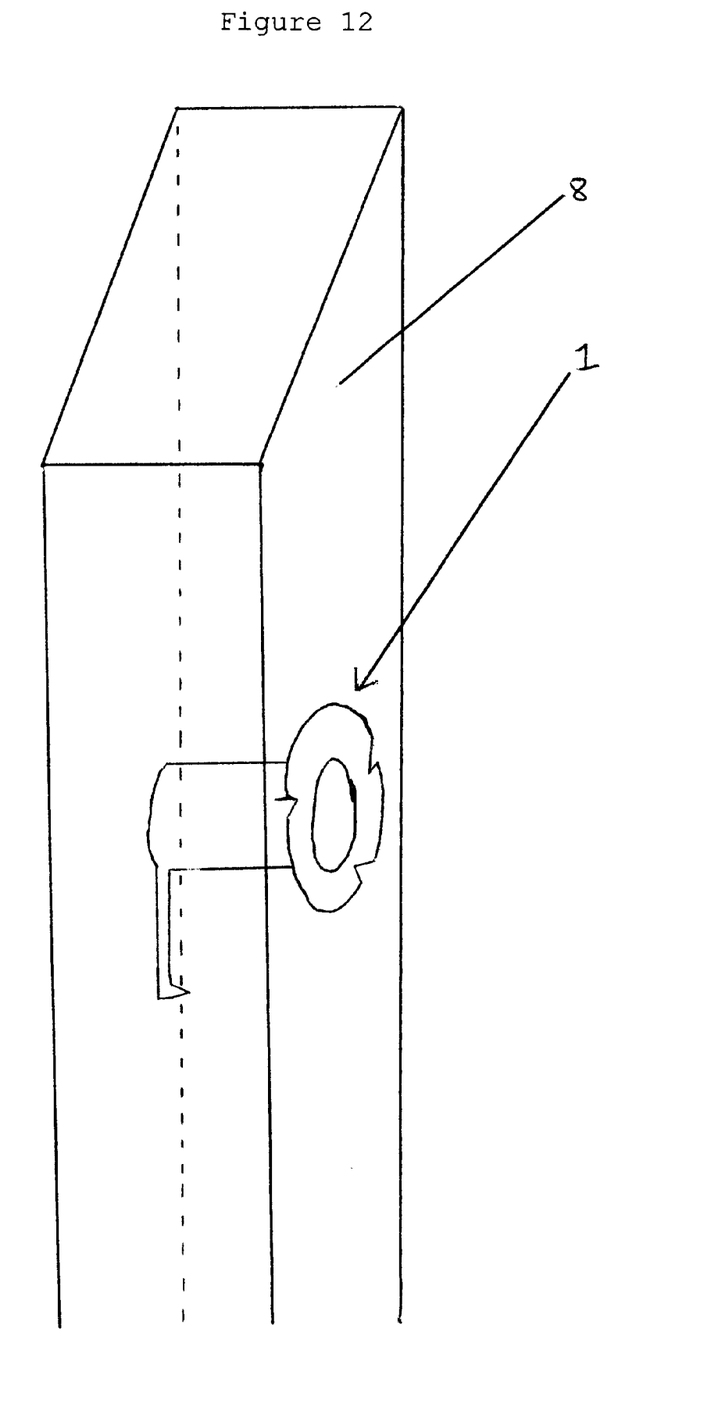
FIG. 12 shows an X-ray view of a wood two by four with the "Protector Sleeve" fully installed.

The only thing protruding past the hole 7 on the side opposite the initial anchor 3 would be the final anchor 5, (the part that looks like a mailbox flag—a triangular pennant 6 attached to a thin rectangular pole with the flag part bent to a right angle from the thin rectangular pole). (FIG. 10.) The final anchor 5 would jut out/project from the stud 8 at a right angle to the stud 8. It should then be tapped into place with a hammer in such a way that it bends at the point of contact with the "Protector Sleeve" 1 body 2. As the final anchor 5 is bent into place the tip of the triangular flag 6 looking part of it will come into contact with the wood stud 8. The triangular flag 6 should be tapped into the wood so that it is embedded and the thin rectangular strip is flush with the wood. (FIG. 11.) When the triangular flag 6 is embedded in the wood it will prevent the "Protector Sleeve" 1 from ever going back out the way it came. Like the fluke of a ships anchor digs into the dirt or sand, the spikes 4&6 of the "Protector Sleeve" 1 anchor dig into the wood and holds it securely in place. Thus, with the initial anchor 3 preventing the body 2 from going through the hole 7 in one direction, and the final anchor 5 preventing the body 2 from going through the hole 7 in the other direction, the "Protector Sleeve" 1 is installed. (FIG. 12.)

Fabrication:

Above is the general idea of the "Protector Sleeve." Its exact measurements will vary depending on the application and whatever any local building codes might require. It is anticipated that the thickness of the metal will need to be one sixteenth of an inch. One sixteenth of an inch should be thick enough to withstand penetration by nails or screws and strong enough to provide structural support. If, for example, the application is for standard electrical wire being run through a standard two by four then the length of the body would be one and a half inches (two by fours are not really two inches by four inches they are one and a half by three and a half), and the outside diameter would be seven eighths of an inch so that it would fit snugly in a hole drilled with a seven eighths drill bit. Since the thickness of the metal used would be one sixteenth of an inch the inside diameter would be three quarters of an inch. This size of "Protector Sleeve" would also work for a two by six, two by eight, two by ten, or two by twelve since they are all really one and a half inches thick.

The "Protector Sleeve" can be produced as a single piece of pressed or stamped steel. The initial anchor and final anchor should be seamlessly connected to the body of the "Protector Sleeve". Even though the initial anchor and final anchor are described separately they are intended to be part of the same continuous piece of steel.

Like a paper clip can be bent many times before it breaks, so too the "Protector Sleeve's" final anchor will be able to be bent into place without breaking.

What is claimed is:

1. I claim a cylindrical grommet comprised of a body having a first end and a second end, an initial anchor at said first end, and a final anchor at said second end, integrally formed as a unit, made of steel or a similarly hard material, that is inserted into a hole drilled through wood studs or joists, said body being substantially cylindrical and made of steel or a similarly hard material that is at least approximately one sixteenth inch thick, said body of being at least as long as the depth of the drilled hole and which fits snugly and flush to the walls of the drilled hole and which serves to protect the wire or pipe installed through the hole from being punctured by nails or screws that might later be nailed or screwed into the wall where the stud or joist is, respectively, said cylindrical grommet being anchored in place initially at said first end by said first anchor comprising steel or a similarly hard material which flares or splays outward at a substantially right angle from the body, and said cylindrical grommet then finally being anchored on said second end by said second anchor comprising a strip of metal that is projected out from the second end of the cylindrical grommet and which, after initial anchoring, is bent downward at a substantially right angle and against the wood studs or joists so that the final anchor is substantially perpendicular to the body.

2. The cylindrical grommet as in claim 1 wherein, both said initial and final anchors additionally include one or more spikes or triangular teeth projecting outward so that said spikes or teeth bite into the wood and hold said initial and final anchors, and thus said grommet, into place.

3. The cylindrical grommet as in claim 2, wherein said spikes or triangular teeth are approximately one quarter inch long.

4. I claim a cylindrical bushing comprised of a body having a first end and a second end, an initial anchor at said first end, and a final anchor at said second end, integrally formed as a unit, made of steel or a similarly hard material, that is at least approximately one sixteenth inch thick, said body being substantially cylindrical, that is inserted into a hole drilled through wood studs or joists, which fits snugly and flush to the walls of the drilled hole and which is at least as long as the depth of the drilled hole, said cylindrical bushing providing a smooth surface during the pull of wires through the hole thereby facilitating the pull of the wire and protecting the wire sheathing from rips/punctures and other compromises that might be caused by wood splinters or burrs existing on the wood walls of the drilled hole, said cylindrical bushing being anchored in place initially at said first end by said first anchor comprising steel or a similarly hard material which flares or splays outward at a substantially right angle from the body, and said cylindrical bushing then finally being anchored on said second end by said second anchor comprising a strip of metal that is projected out from the second end of said cylindrical bushing and which, after initial anchoring, is bent downward at a substantially right angle and against the wood studs or joists so that the final anchor is substantially perpendicular to the body.

5. The cylindrical bushing as in claim 4 wherein, both said initial and final anchors comprise one or more spikes or triangular teeth projecting outward so that said spikes or teeth bite into the wood and hold said initial and final anchors, and thus said bushing, into place.

6. The cylindrical bushing as in claim 5 wherein said spikes or triangular teeth are approximately one quarter inch long.

7. I claim a structural reinforcing cylindrical grommet/bushing comprised of a body having a first end and a second end, an initial anchor at said first end, and a final anchor at said second end, integrally formed as a unit, made of steel or a similarly hard material, that is at least approximately one sixteenth inch thick, said body being substantially cylindrical, that is inserted into a hole drilled through wood studs or joists, which is at least as long as the drilled hole and which fits snugly and flush to the walls of the drilled hole, and serves to reinforce the wood studs or joists by distributing the load(s) around the drilled hole where the hole would otherwise weaken the studs or joists, said cylindrical grommet/bushing being anchored in place initially at said first end by said first anchor comprising steel or a similarly hard material which flares or splays outward at a substantially right angle from the body, and said cylindrical grommet/bushing then finally being anchored on said second end by said second anchor comprising a strip of metal that is projected out from the second end of said cylindrical grommet/bushing and which, after initial anchoring, is bent downward at a substantially right angle and against the wood studs or joists so that said final anchor is substantially perpendicular to the body.

8. The cylindrical grommet/bushing as in claim 7 wherein, both said initial and final anchors comprise/include one or more spikes or triangular teeth projecting outward so that said spikes or teeth bite into the wood and hold said initial and final anchors, and thus said grommet/bushing, into place.

9. The cylindrical grommet/bushing as in claim 8 wherein said spikes or triangular teeth are approximately one quarter inch long.

* * * * *